United States Patent [19]

Vitale

[11] 4,347,599
[45] Aug. 31, 1982

[54] SPINDLE CLAMP ASSEMBLY FOR A VIDEO RECORDER-PLAYBACK MACHINE

[75] Inventor: George Vitale, Torrance, Calif.

[73] Assignee: Discovision Associates, Costa Mesa, Calif.

[21] Appl. No.: 198,694

[22] Filed: Oct. 20, 1980

[51] Int. Cl.³ .......................... G11B 25/04; G11B 3/62
[52] U.S. Cl. ...................................... 369/270; 369/261
[58] Field of Search ............... 369/270, 271, 261, 206, 369/207, 208; 360/86, 97, 99; 346/137

[56] References Cited

U.S. PATENT DOCUMENTS 4,252,327 2/1981 Elliott et al. ..................... 369/261 X

FOREIGN PATENT DOCUMENTS

55-125587 9/1980 Japan ................................... 369/270

Primary Examiner—Harry N. Haroian
Attorney, Agent, or Firm—Ronald J. Clark

[57] ABSTRACT

A spindle clamp assembly for a video recorder-playback machine is provided for securely clamping a video information disc in a precisely centered position upon a rotatable drive spindle for the machine. The clamp assembly comprises a radially expansible sleeve mounted on the spindle and sized for reception into a central opening of the disc. The expansible sleeve cooperates with a wedge collet biased downwardly by a spring within a clamp housing for uniform radial expansion of the sleeve and centering the disc upon the spindle. The clamp housing further includes means for locking engagement with the spindle to position a clamping ring in spring biased engagement with the disc to clamp the disc securely upon the spindle for rotation therewith.

37 Claims, 5 Drawing Figures

SPINDLE CLAMP ASSEMBLY FOR A VIDEO RECORDER-PLAYBACK MACHINE

BACKGROUND OF THE INVENTION

This invention relates generally to improvements in video recorder-playback machines, and more specifically, to an improved spindle clamp assembly for securely positioning and accurately centering a video information disc on a rotatable drive spindle of a video recorder-playback machine.

Video recorder-playback machines in general are known in the art and include appropriate means for recording and/or playing back a video information signal utilizing a selected medium for storage of the signal. For example, in one type of machine, the video signal is recorded magnetically for storage and/or retrieval upon a length of so-called video tape. In another type of system, the video signal is recorded upon an information disc for retrieval by means of a stylus, in a manner analogous to that of sound reproduction from phonographic records. In still another type of system, the video signal is used to frequency modulate a beam of amplified light, such as a laser beam, with sufficient power for physically altering the surface characteristics of a light sensitive coating on a video information disc and thereby record the signal upon the disc. During playback, a lower power light beam is reflected from the disc and the resulting signal is demodulated to reproduce the recorded signal. In all of these types of systems, the video information signal can be combined with an appropriate audio signal for either recording or playback purposes to yield a composite audio-video signal of the type commonly used for television transmissions and the like. For convenience, however, the signal will be referred to herein as a video information signal.

Video recorder-playback machines utilizing amplified light beams for recording and playback purposes offer significant advantages in that all physical contact of the recording and playback elements with the storage medium, namely, the information disc, is avoided. This prevents wear and deterioration of the machine elements and the disc, resulting in a high quality stored video signal which can be played back repeatably over a long period of time with unimpaired video resolution.

In video recorder-playback machines using amplified light beams for signal recording and playback, the recording and playback optical beams are focused upon the video information disc by a focusing lens which traverses the span of the disc in a radial direction simultaneously with rotation of the disc. In this manner, a spiral pattern of closely spaced tracks is formed on the disc to represent the video information. For maximum storage capacity for each disc, togehter with maximum signal resolution, the information tracks are formed to have a narrow width such as on the order of about 0.5 microns, and the center-to-center spacing between radially adjacent tracks in the spiraling pattern is on the order of about 1.5 microns. Accordingly, to prevent cross talk between the tracks during recording and/or playback operation, it is imperative that the video information disc be rotatably driven about a precisely located and repeatably obtained axis of rotation to minimize radial eccentricities. In the prior art, this accurate positioning and centering has been obtained by precisely forming an axially centered opening in the video information disc for reception of the disc upon a correspondingly precisely formed rotating spindle. However, with this construction, the disc opening and spindle tolerances are crucial for accurate centering of the disc within the allowable range of radial error. This centering problem becomes increasingly apparent with prolonged use since the central disc opening tends to enlarge over time as a result of wear.

Another problem encountered in the prior art is that the disc must be securely clamped upon the spindle for consistent and accurate rotation therewith without slippage. This slippage problem is compounded by the relatively high speed of normal disc rotation, such as about 1800 rpm, together with the fact that a plurality of information discs tend to display a variation in thickness whereby any clamping means for securing a disc in position must be adapted for accommodating discs of varying thickness. Moreover, in a mastering machine for recording information upon a master disc for use subsequently in making production disc replicas, the master disc is typically formed from a fragile material such as polished glass. The clamping means must be adapted for securing the disc upon the spindle without substantial strain forces to avoid risk of breakage during clamping or high speed rotation.

The present invention overcomes the problems and disadvantages of the prior art by providing an improved spindle clamp assembly for a video recorder-playback machine which accurately and repeatably centers a video information disc upon a rotatable drive spindle, and which securely clamps the disc in position upon the spindle without excessive strain forces.

SUMMARY OF THE INVENTION

In accordance with the invention, a spindle clamp assembly for a video recorder-playback machine is provided for quickly and easily positioning a video information disc upon a rotatable drive spindle in a precisely centered location for accurate rotation about the axis of the spindle. This disc can be repeatably removed from and replaced upon the spindle in the same precisely centered position for high quality recordation and playback of a video information signal. Moreover, the clamp assembly securely clamps the disc upon the spindle with a controlled clamping force and without applying undue strain to the disc. The controlled clamping force has approximately the same magnitude regardless of the specific thickness of the disc, whereby the clamp assembly enables the machine to accommodate a variety of information discs of different thickness.

The clamp assembly comprises a radially expansible sleeve carried at the upper end of the rotatable drive spindle and having an upwardly and radially inwardly presented tapered conical face. The sleeve face cooperates with a wedge collet received over the spindle and having a downwardly and radially outwardly presented tapered conical face. The clamp assembly further includes a clamp housing with locking means receivable over and engagable with the upper end of the spindle to lock an information disc upon the spindle with a central opening in the disc receiving the expansible sleeve. A spring within the clamp housing biases the wedge collet in a downward direction to expand the sleeve radially for substantially uniformly engaging the disc within its central opening and thereby accurately, precisely, and repeatably centering the video information disc upon the spindle.

The clamp housing further carries a downwardly presented annular clamping ring projecting beyond the lower entent of the housing for clamping engagement with the video information disc. This clamping ring is vertically movable with respect to the clamp housing and is spring biased to apply a substantially uniform downward clamping force annularly to the invormation disc when the clamp assembly is lockingly received upon the spindle. The degree of vertical mobility of the clamping ring is chosen so that the clamping ring engages and clamps securely a video information disc having a thickness within a predetermined thickness range.

Other features and advantages of the present invention will become apparent from the following detailed description, taken in conjunction with the accompanying drawings, which illustrate by way of example the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, the present invention is embodied in a video recorder-playback machine 10 having suitable optical and electronic elements for recording and playback of video information from a video information disc 14. The invormation disc 14 is removably supported within the machine upon a spindle assembly 18 for controlled high speed rotation of the disc during the recording and playback operations. A clamp assembly 20 cooperates with the spindle assembly 18 to clamp the disc 14 in a precisely centered position for accurate, high speed rotation without radial substantial eccentricities or rotational slippage.

The machine 10, including the clamp assembly 20 of this invention, comprises an improvement over the prior art in that the clamp assembly 20 is designed to center the disc 14 accurately and repeatably with respect to the axis of rotation of the spindle assembly 18. The disc 14 is centered quickly and easily by placement of the clamp assembly 20 in locking engagement with the spindle assembly 18 and without requiring a precise or close tolerance between a disc central opening 15 and the spindle assembly 18. The invention provides additional improvements in that the clamp assembly 20 is adapted to secure upon the spindle assembly 18 any of a multiplicity of discs having a variety of different thicknesses with substantially uniform clamping forces whereby the machine can accommodate a variety of discs of different thickness without slippage during rotation.

Figure 1:
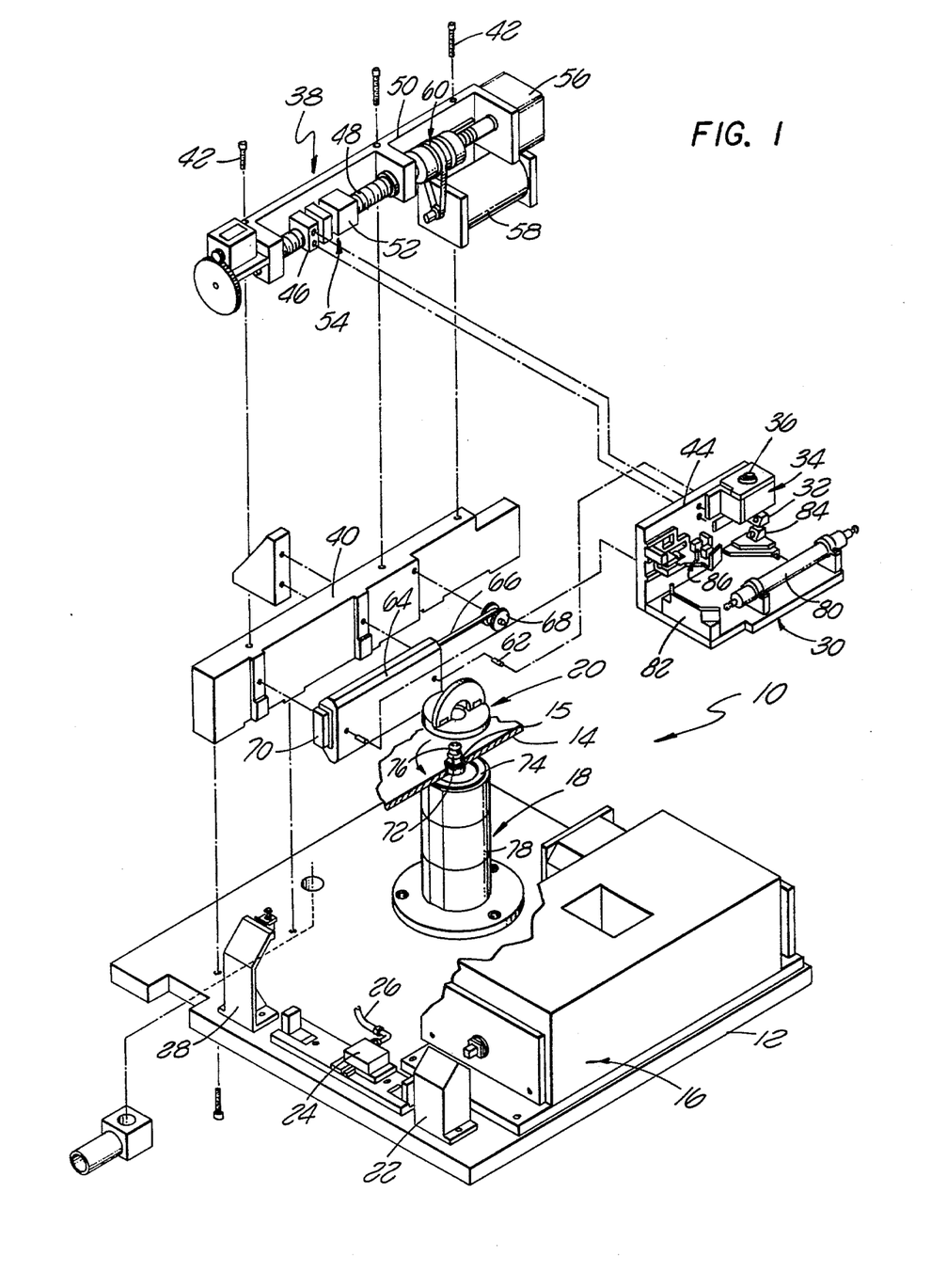
FIG. 1 is a fragmented perspective view illustrating, partially in exploded form, a video recorder-playback machine.

As shown in FIG. 1, the video recorder-playback machine 10 includes a machine base 12 which provides support for a relatively high power laser generator unit 16, such as an argon ion laser, for use in recording a prescribed video information signal upon the disc 14. The high power laser generator unit 16 emits a highly amplified collimated beam of light for redirection by a suitable mirror assembly 22 to an electronically driven modulator 24. The modulator 24 is driven by a suitable frequency modulated electronic signal supplied via an input lead 26 wherein the electronic signal is representative of the desired video information. The modulator 24 responds to the electronic signal to interrupt appropriately the amplified beam of light to pass a corresponding modulated optical signal beam. This resultant optical signal beam is therefore representative of the prescribed video information. Conveniently, in many instances, the electronic signal comprises a composite audio-video signal of the type commonly used in television transmissions and which, when supplied to the modulator 24, yields an optical signal beam representative of the composite audio and video information. However, for sake of clarity and ease of description, all further reference herein will be to video information.

The modulated optical signal beam is incident upon a second mirror assembly 28 for redirection to a mobile optics carriage 30. This optics carriage 30 includes an angularly disposed dichroic mirror 32 for reflection of the optical signal beam in an upward direction for passage through a focusing assembly 34. The focusing assembly 34 carries an objective lens assembly 36 for focusing the optical signal beam to a precise spot on the underside of the video information disc 14.

The optics carriage 30 is movably positioned by a carriage drive assembly 38 along a path in a radial direction with respect to the disc 14. In this manner, the objective lens assembly 36 is movably positioned with respect to the disc 14 along a radius of the disc to control the point of focusing of the optical signal beam upon the disc. The carriage drive assembly 38 comprises a precision lead screw 48 supported for rotation by a bracket 50 which can be secured to a frame 40 and to the machine base 12 by a plurality of bolts 42. The lead screw 48 threadably receives a lead screw nut 52 coupled via a nonrotational coupling indicated at 54 to a sleeve-type push block 46 received freely about the lead screw 48. As illustrated, the push block 46 is secured to an upright wall 44 of the optics carriage 30.

The lead screw 48 is oriented in a direction parallel with the required radial direction of movement of the optics carriage 30. A relatively slow speed motor 56 and a relatively high speed motor 58 are connected to the lead screw 48 through a selective clutch unit 60, and this clutch unit is operated to control driving of the lead screw 48 about its own axis either at a relatively slow or relatively fast speed of rotation.

As illustrated in FIG. 1, the optics carriage 30 is driven by the lead screw 48 in a radially outward direction with respect to the disc 14 whenever the lead screw 48 is rotated to cause the lead screw nut 52 to push against the push block 46. When the lead screw is rotated in an opposite direction, the lead screw nut 52 travels along the screw in an opposite direction. To assure that the optics carriage 30 follows in the opposite, or radially inward direction, the carriage 30 is secured by pins 62 to a linear track member 64 which is springably urged with respect to the disc 14 in the radially inward direction by a constant tension band spring 66 wound about a barrel 68 secured to the frame 40. The track member 64 is slidably mounted on a track guide 70 to accommodate movement linearly of the optics carriage 30 in both the radially inward and the radially outward directions.

For a more detailed description of the carriage drive assembly 38, see concurrently filed and copending U.S. application Ser. No. 198696, filed 10/20/80 entitled DRIVE ASSEMBLY FOR A VIDEO RECORDER-PLAYBACK MACHINE, which is incorporated by reference herein.

The video information disc 14 is rotatably driven about a vertical axis by the spindle assembly 18 simultaneously with linear movement of the optics carriage 30. More specifically, the disc 14 is vertically supported upon a rotatable drive spindle 72 including an upwardly extending annular shoulder 74 for supporting the disc and an upper shaft portion 76 received through the disc central opening 15. The drive spindle 72 is carried within an upright spindle housing 78 which is secured to the machine base 12 and supports the spindle 72 for relatively high speed rotation, such as on the order of about 1800 rpm, about its vertical axis. A drive motor (not shown) is drivingly coupled to the spindle 72 for rotating the spindle at the relatively high speed of rotation.

For a more detailed description of the spindle assembly 18, see concurrently filed and copending U.S. application Ser. No. 198,695, filed 10/20/80 entitled SPINDLE ASSEMBLY FOR A VIDEO RECORDER-PLAYBACK MACHINE, which is incorporated by reference herein.

In operation, the optical signal beam is focused upon the underside of the video information disc 14 by the radially traversing objective lens assembly 36 on the optics carriage 30 simultaneously with high speed rotation of the disc. By appropriately controlling the relationship between radial traversal and rotational speed, the optical signal beam is focused upon the disc along a spiraling pattern of closely spaced tracks. Importantly, the disc 14 includes a photosensitive coating, such as a layer of thin metal or a photoresist material, adapted to be physically altered by the high power optical signal beam whereby the optical signal beam is physically recorded upon the disc as a pattern of discontinuities representative of the prescribed video information. In practice, the closely spaced tracks have a width on the order of about 0.5 microns and a center-to-center spacing of about 1.5 microns.

As illustrated in FIG. 1, a relatively low power laser generator unit 80, such as a helium-neon laser, is mounted directly upon the optics carriage 30 for use in retrieving or playing back the recorded video information from the disc 14. This low power laser generator unit 80 emits an amplified and collimated beam of light for reflection off the disc 14 whereby the reflected optical beam comprises a modulated playback beam which is alternately reflected and nonreflected in accordance with the recorded video information. This modulated playback beam is of sufficiently low power to avoid physical alteration of the photosensitive coating on the disc 14.

The amplified beam of light from the low power laser generator unit 80 is redirected by a suitable mirror assembly 82 on the optics carriage 30 for appropriate incidence upon an angularly oriented mirror 84 which reflects the beam upwardly through the dichroic mirror 32 for focusing upon the disc 14 by the objective lens assembly 36. The reflected modulated playback beam is returned through the lens assembly 36 and by the mirror 84 to appropriate optical and electronic components 86 for demodulating the playback beam to the form of an electronic signal representative of the prescribed video information. This electronic signal can be supplied to an appropriate video display device, such as a television receiver, for playback of the recorded video information. Importantly, playback can occur independently of the recording function or substantially simultaneously with the recording function to serve as a check of the recording resolution.

Further details of the optical components of the recorder-playback machine 10 are described in concurrently filed and copending U.S. application Ser. No. 198693 filed 10/20/80, entitled VIDEO RECORDER-PLAYBACK MACHINE, and further specific details of the objective lens assembly 36 including the focusing assembly 34 are described in concurrently filed and copending U.S. application Ser. No. 198,697, filed 10/20/80, entitled LENS ASSEMBLY FOR A VIDEO RECORDER-PLAYBACK MACHINE, both of which are incorporated by reference herein.

The clamp assembly 20 of this invention is provided for securely mounting the information disc 14 upon the spindle assembly 18 in a precise and repeatably obtained centered location so as to allow accurate positioning of the optical beams for precision recording and playback without cross talk between the closely spaced tracks. Moreover, the clamp assembly 20 is provided for securely clamping the disc 14 in position on the spindle assembly 18 so as to assure consistent and accurate rotation of the disc at the required relatively high rotational speeds. This clamping is obtained without undue strain on the disc so as to allow relatively fragile discs formed from polished glass or the like to be used, such as during a mastering process, and to allow the machine to accommodate discs having a variety of thicknesses.

The clamp assembly 20 of this invention is shown in more detail in FIGS. 2–5 and comprises a shell-shaped, downwardly open housing 88 including locking means for locking engagement with the upper shaft portion 76 of the rotatable drive spindle 72, as will be described in more detail. Moreover, the clamp assembly 20 includes a radially expansible sleeve 90 and an annular wedge collet 92 mounted over the spindle assembly shaft portion 76 for cooperating with each other and with the locking means for radially centering the disc on the rotatable drive spindle 72.

Figure 2:
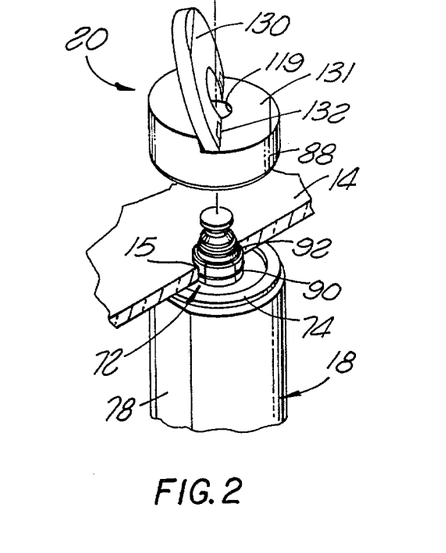
FIG. 2 is an enlarged fragmented perspective view of a portion of the machine illustrating, partially in exploded form, use of the spindle clamp assembly of this invention.
Figure 3:
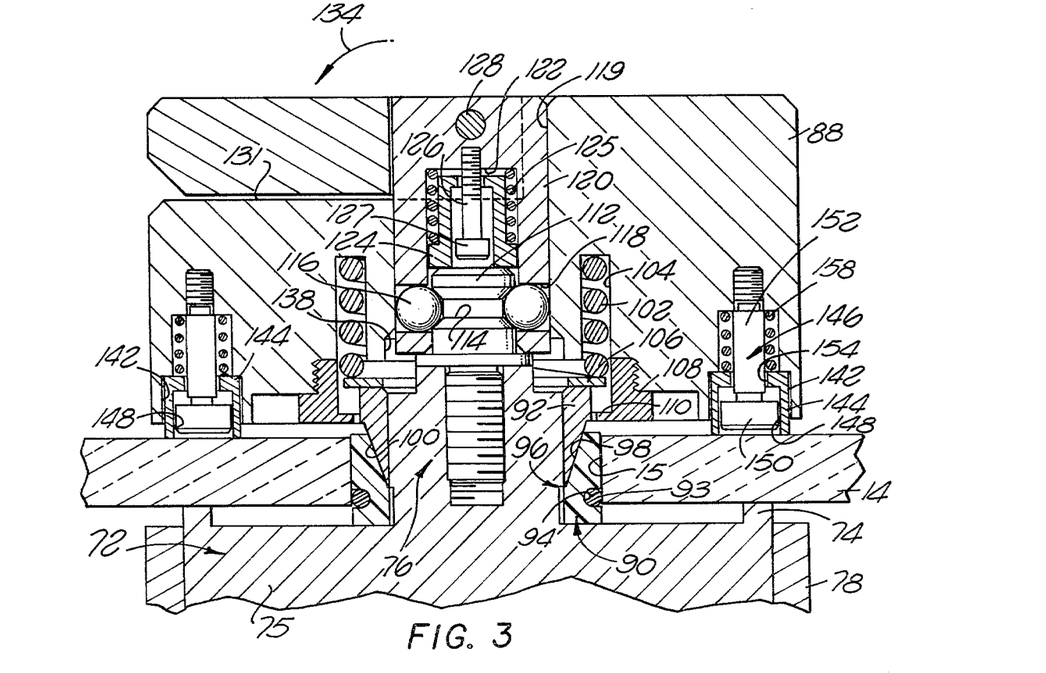
FIG. 3 is an enlarged fragmented vertical section of the spindle clamp assembly illustrating the invention in locking engagement with a rotatable drive spindle of the machine.

As best shown in FIGS. 2 and 3, the rotatable drive spindle 72 includes a radially enlarged base 75 of relatively wide cross section from which the annular shoulder 74 extends upwardly. This base 75 merges with the upper shaft portion 76 of a relatively narrow cross section for reception within the central opening 15 of the video information disc 14. The upper shaft portion 76 is positioned in alignment with the vertical axis of the spindle assembly 18, whereby rotational driving of the spindle 72 within the spindle housing 78 rotates the upper shaft portion 76 about said vertical axis.

The spindle upper shaft portion 76 is sized for relatively loose reception of the radially expansible sleeve 90 which is in turn relatively loosely receivable within the cental opening 15 of the disc 14. This radially expansible sleeve 90 is formed from a suitable plastic material such as Delrin or the like, and comprises an annular split sleeve which is retained relatively snugly about the shaft portion 76 by a resilient retaining ring 93, such as an O-ring, received in a peripheral sleeve groove 94. Conveniently, if desired, the sleeve 90 and the upper shaft portion 76 can include complementary shaped shoulders, as illustrated at 96, for preventing slippage of the sleeve 90 upwardly off the shaft portion 76. Importantly, as illustrated, the sleeve 90 includes an angularly upwardly and radially inwardly presented tapered conical face 98 for engagement with the wedge collet 92.

The wedge collet 92 is received about the upper shaft portion 76 above the expansible sleeve 90, and is formed from a relatively rigid, non-expansible material such as stainless steel or the like. The wedge collet 92 is vertically slidable with respect to the upper shaft portion 76 and includes an angularly downwardly and radially outwardly tapered conical face 100 for engagement with the conical face 98 of the sleeve 90.

The housing 88 of the clamp assembly 20 includes a compression spring 102 for biasing the wedge collet 92 downwardly into engagement with the sleeve 90 when the assembly 20 is lockingly received over the spindle 72. More specifically, the spring 102 is retained within an annular chamber 104 in the housing 88 and bears downwardly against an annular washer 106. This washer 106 is retained within the housing 88 by an annular plug 108 threadably secured into the housing and including a radially inwardly projecting annular stop 110 for limiting downward vertical motion of the washer 106. However, when the assembly 20 is received over the spindle 72, the washer 106 bears downwardly against the wedge collet 92 as illustrated in FIG. 3 for substantially uniform radial expansion of the split sleeve 90. In this manner, the sleeve 90 is expanded to bearingly engage the disc 14 within the central opening 15 with substantially uniform radial forces whereby the disc 14 is accurately centered on the spindle 72.

A locking stud 112 is threadably secured into the upper shaft portion 76 of the spindle and extends upwardly therefrom along the vertical axis of the spindle 72. The locking stud 112 includes a radially outwardly presented recess 114 for receiving locking balls 116 for locking engagement with the clamp assembly 20. These locking balls 116 are carried within complementary-sized radial passages 118 formed near the lower end of a locking cylinder 120 which is received in a vertically extending passage 119 within the housing 88.

The locking cylinder 120 includes a downwardly open cylindrical chamber 122 receiving a cylindrical cap-shaped bushing 124 biased downwardly by a small compression spring 125 within the chamber 122. The cylinder 120 also carries a push pin 126 projecting downwardly through the bushing 124 for bearing engagement with the top of the stud 112. When the clamp assembly 20 is lockingly received over the upper shaft portion 76 of the spindle 72, the bushing 124 bears against the top of the stud 112, and the head 127 of the push pin 126 is slightly spaced above the top of the stud, as illustrated in FIG. 3.

Figure 5:
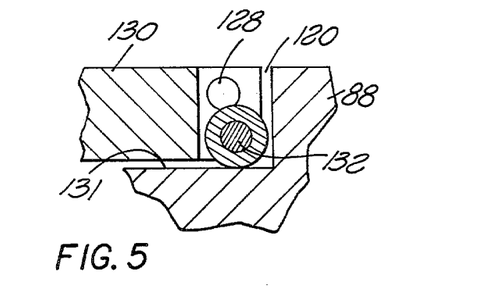
FIG. 5 is an enlarged fragmented vertical section of a portion of the spindle clamp assembly taken substantially along the line 5—5 of FIG. 4.

The upper end of the locking cylinder 120 is secured to a horizontally extending axle rod 128 which is carried for rotation within the opposite ends of a generally U-shaped lever arm 130. This lever arm 130 carries at its opposite ends a pair of cam rollers 132 in rolling engagement with the upper surface 131 of the housing 88. As illustrated in FIG. 5, the axis of rotation of the axle rod 128 is positioned above the axis of rotation of the rollers 132, whereby pivoting motion of the lever arm 130 with the rollers 132 in rolling engagement with the housing 88 serves to vertically shift the position of the locking cylinder 120 within the passage 119 with respect to the housing 88.

Figure 4:
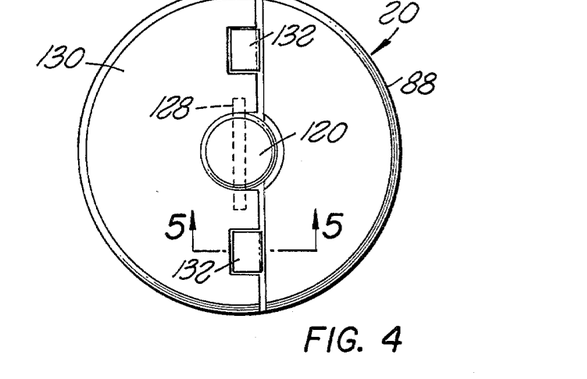
FIG. 4 is a top plan view of the spindle clamp assembly.

In use, rotation of the lever arm 130 in the direction of arrow 134 in FIG. 3 to the horizontal position illustrated in FIGS. 3–5 serves to lift the locking cylinder 120 within the housing 88 to bring the locking balls 116 into registry with the stud locking recess 114. More specifically, the cylinder passage 119 in the housing 88 is sized to urge and retain the balls 116 radially inwardly within their radial passages 118 into the stud recess 114 to lock the clamp assembly 20 upon the stud 112 and to prevent upward movement of the locking cylinder 120 within the housing 88. Importantly, in this position, the annular washer 106 is in bearing engagement with the wedge collet 92 for appropriate radial expansion of the sleeve 90 and accurate centering of the disc 14.

When the lever arm 130 is rotated upwardly in the direction opposite to arrow 134 in FIG. 3, toward the generally vertical position illustrated in FIG. 2, the locking cylinder 120 is pushed by the rod 128 downwardly within the housing 88 to bring the head 127 of the push pin 126 into bearing engagement with the top of the stud 112. At this point, the locking cylinder 120 is itself locked against downward movement by the balls 116 in the stud recess 114 whereby the housing 88 lifts with respect to the locking cylinder 120. This lifting motion of the housing 88 brings an enlarged annular chamber 138 in the housing 88 into vertical alignment with the radial ball passages 118 whereby the balls 116 are allowed to displace radially outwardly from the locking recess 114 of the stud 112. This allows the housing 88 and the locking cylinder 120 to be lifted simultaneously from the stud 112, whereupon the spring 125 urges the bushing 124 downwardly to close off the inner diameter of the ball passages 118 and thereby retain the balls 116 in the enlarged housing chamber 138. The head 127 of the push pin 126 limits downward movement of the bushing 124 out of the locking cylinder chamber 122.

The clamp assembly 20 is quickly and easily repositioned in locking engagement with the stud 112 by pressing the housing 88 over the stud and moving the lever arm 130 back to the horizontal position shown in FIGS. 3–5. This causes the stud 112 to retract the bushing 124 upwardly within the chamber 122 against the force of the spring 125, and thereby allows radially inward movement of the balls 116 into the stud recess 114 when appropriate vertical alignment is obtained. The downward pivoting motion of the lever arm 130 shifts the locking cylinder 120 upwardly within the housing 88 to draws the balls 116 upwardly out of alignment with the enlarged housing chamber 138 and into the stud recess 115. At the same time, the washer 106 is moved into downward bearing engagement with the wedge collet 92.

The housing 88 of the clamp assembly 20 also includes a downwardly open annular chamber 142 formed encircling the periphery of the housing 88 for receiving a downwardly projecting annular clamping ring 144. This clamping ring 144 is sized and shaped for bearing engagement with the upper surface of the information disc 14 generally on an annulus vertically aligned with the underlying spindle shoulder 74. The clamping ring 144 is movably positioned vertically within this chamber 142 by a plurality of cap screws 146 received at intervals about the ring in slots 148 and threadably secured into the housing 88. More specifically, as illustrated in FIG. 3, each cap screw 146 includes a cap 150 received in the associated ring slot 148, and a narrow shank 152 projecting through a complementary opening 154 in the ring for threaded reception into the housing. Importantly, a relatively shallow chamber 156 is formed in the housing 88 surrounding a portion of the shank 152 of each cap screw 146, and a relatively low pressure spring 158 is received within each chamber 156 for reacting compressively between the housing 88 and the clamping ring 144. In this manner, the springs 158 urge the clamping ring 144 downwardly under pressure into a normal position in bearing engagement with the heads 150 of the cap screws 146.

When the clamp assembly 20 is lockingly received upon the spindle assembly 18, the clamping ring 144 bearingly engages the upper surface of the information disc 14 generally above the annular shoulder 74 of the rotatable drive spindle 72. The clamping ring 144 retracts upwardly against the pressure of the springs 158 so as to apply a substantially uniform clamping force annularly about the disc in accordance with the characteristics of the springs 152. Importantly, this retraction of the springs 152 causes a vertical spacing between the cap screw heads 150 and the clamping ring 144. Within the allowable limits of this vertical spacing, the clamping ring 144 accommodates a variety of information discs of varying thickness without detrimentally affecting the ability of the clamp assembly 20 to securely clamp the disc 14 in a centered position upon the spindle assembly 18. Importantly, this allowable limit of vertical spacing is chosen to be relatively narrow relative to the characteristics of the springs 158 whereby the clamping force applied to a given disc 14 is substantially uniform for a plurality of discs having a thickness within a predetermined range.

Accordingly, the spindle clamp assembly 20 of this invention for a video recorder-playback machine 10 securely and accurately centers the information disc 14 upon a spindle assembly 18 in a precise and repeatable manner. Moreover, the clamp assembly 20 provides a clamping force to the disc for securely positioning the disc having a thickness within a prescribed range during high speed rotation against possible rotational slippage. The applied clamping forces are substantially uniformly applied annularly about the disc, and are applied directly above an underlying support in the form of the spindle shoudler 74, whereby relatively little strain is applied to the disc, and the clamp assembly can be used safely with fragile discs, such as polished glass discs used in a mastering process.

A variety of modifications and improvements to the spindle clamp assembly of this invention are believed to be apparent to one skilled in the art. Accordingly, no limitation on the invention is intended, except as set forth in the appended claims.

What is claimed is:

1. A spindle clamp assembly for positioning a disc upon a rotatable drive spindle having a shaft portion for reception through an opening formed in the disc, comprising:
   a radially expansible sleeve receivable about the spindle and within the opening formed in the disc;
   a collet receivable about the spindle adjacent said sleeve, said sleeve and said collet being configured with respect to each other such that displacement of said collet toward said sleeve causes substantially uniform radial expansion of said sleeve into bearing engagement with the disc for centering the disc with respect to the spindle;
   a clamp housing receivable over the spindle and including locking means for locking engagement with the spindle for retaining the disc on the spindle; and
   biasing means carried by said housing for engaging said collet when said housing is received over the spindle for displacing said collet toward said sleeve for radial expansion of said sleeve.

2. The spindle clamp assembly of claim 1 wherein said sleeve includes a tapered annular face presented radially inwardly and generally toward said collet, and wherein said collet includes a face presented generally toward said sleeve for bearing engagement with said sleeve face.

3. The spindle clamp assembly of claim 2 wherein said collet face comprises a tapered annular face presented radially outwardly and generally toward said sleeve.

4. The spindle clamp assembly of claim 1 wherein said sleeve comprises a split collet.

5. The spindle clamp assembly of claim 1 including retainer means for normally biasing said sleeve to a radially non-expanded configuration.

6. The spindle clamp assembly of claim 5 wherein said sleeve has a radially outwardly presented groove formed therein, said retainer means comprising a resilient ring received in said groove.

7. The spindle clamp assembly of claim 1 wherein the spindle includes means forming a radially outwardly presented recess, and wherein said locking means comprises:
   a locking cylinder movably carried in said housing and having a plurality of radial passages formed therein;
   locking balls received in said passages; and
   means for moving said cylinder between a first position with said locking balls positioned partially within said recess for locking said housing on the spindle, and a second position with said locking balls in registry with a radially enlarged chamber formed in said housing for allowing displacement of said balls from said recess formed in said spindle and removal of said housing from the spindle.

8. The spindle clamp assembly of claim 7 further including means for preventing radially inward motion of said locking balls when said housing is removed from the spindle.

9. The spindle clamp assembly of claim 1 wherein said biasing means comprises an annular washer carried for movement with respect to said housing for engagement with said collet when said housing is received over the spindle, and spring means reacting between said housing and said washer for urging said washer into bearing engagement with said collet.

10. The spindle clamp assembly of claim 9 further including stop means for limiting displacement of said washer with respect to said housing.

11. The spindle clamp assembly of claim 1 including an annular clamping ring, means for mounting said clamping ring for limited movement with respect to the disc in a plane generally parallel to the disc, and means for urging said clamping ring into annular engagement with the disc about the disc opening when said housing is received over the spindle to apply a substantially uniform clamping force annularly to the disc.

12. The spindle clamp assembly of claim 11 wherein said housing includes an annular chamber opening toward the disc for receiving said clamping ring, said ring having a height sufficient to project out of said chamber toward the disc, said means for urging said ring into annular engagement with the disc comprising spring means reacting between said housing and said ring.

13. The spindle clamp assembly of claim 12 wherein said spring means is adapted for applying a substantially uniform clamping force to the disc within the range of limited ring movement.

14. The spindle clamp assembly of claim 11 wherein the spindle includes an enlarged base with an upstanding annular flange for vertically supporting the disc, and wherein said clamping ring is positioned to apply said clamping force to the disc generally in vertical alignment with the annular flange on the spindle.

15. A spindle clamp assembly for positioning a disc upon a rotatable drive spindle having a shaft portion for reception through an opening formed in the disc, comprising:
   radially expansible means receivable about the spindle and within the opening formed in the disc;
   clamping means receivable over the spindle for locking engagement with the spindle and for retaining the disc on the spindle; and
   means for cooperating between said clamping means and said radially expansible means for substantially uniformly radially expanding said expansible means into bearing engagement with the disc for centering the disc with respect to the spindle.

16. The spindle clamp assembly of claim 15 wherein said radially expansible means comprises a radially expansible sleeve having a tapered annular face presented radially inwardly and generally toward said clamping means; and wherein said cooperating means comprises a collet having a face presented generally toward said sleeve for bearing engagement with said sleeve face, and spring means reacting between said clamping means and said collet for displacing said collet into bearing engagement with said sleeve for substantially uniformly radially expanding said sleeve when said clamping means is received over the spindle.

17. The spindle clamp assembly of claim 15 wherein the spindle includes means forming a radially outwardly presented recess, and wherein said clamping means comprises:
   a housing;
   a locking cylinder movably carried in said housing and having a plurality of radial passages formed therein;
   locking balls received in said passages; and
   means for moving said cylinder between a first position with said locking balls positioned partially within said recess for locking said housing on the spindle, and a second position with said locking balls in registry with a radially enlarged chamber formed in said housing for allowing displacement of said balls from said recess and removal of said housing from the spindle.

18. The spindle clamp assembly of claim 15 wherein said clamping means further includes a housing, an annular clamping ring, means for mounting said clamping ring for limited movement with respect to the disc in a plane generally parallel to the disc, and means for urging said clamping ring into annular engagement with the disc about the disc opening when said housing is received over the spindle to apply a substantially uniform clamping force annularly to the disc.

19. The spindle clamp assembly of claim 18 wherein said housing includes an annular chamber opening toward the disc for receiving said clamping ring, said ring having a height sufficient to project out of said chamber toward the disc, said means for urging said ring into annular engagement with the disc comprising spring means reacting between said housing and said ring.

20. A spindle clamp assembly for positioning a disc upon a rotatable drive spindle having a shaft portion for reception through an opening formed in the disc, and a base for vertically supporting the disc, comprising:
   a radially expansible sleeve receivable about the spindle and within the opening formed in the disc, said sleeve having an upwardly and radially inwardly presented tapered face;
   a collet receivable about the spindle above said sleeve and including a downwardly and radially outwardly presented tapered face for bearing engagement with said sleeve face;
   locking means receivable over the spindle in locking engagement therewith for retaining the disc on the spindle; and
   biasing means received about the spindle between said locking means and said collet for engaging said collet when said locking means is received over said spindle for displacing said collet downwardly with its outwardly presented tapered face in bearing engagement with said sleeve face for causing substantially uniform radial expansion of said sleeve into bearing engagement with the disc for centering the disc with respect to the spindle.

21. The spindle clamp assembly of claim 20 including retainer means for normally biasing said sleeve to a radially non-expanded configuration.

22. The spindle clamp assembly of claim 20 wherein the spindle includes means forming a radially outwardly presented recess, and wherein said locking means comprises:
   a housing;
   a locking cylinder movably carried in said housing and having a plurality of radial passages formed therein;
   locking balls received in said passages; and
   means for moving said cylinder between a first position with said locking balls positioned partially within said recess for locking said housing on the spindle, and a second position with said locking balls in registry with a radially enlarged chamber formed in said housing for allowing displacement of said balls from said recess and removal of said housing from the spindle.

23. The spindle clamp assembly of claim 22 further including means for preventing radially inward motion of said locking balls when said housing is removed from the spindle.

24. The spindle clamp assembly of claim 22 wherein said biasing means comprises an annular washer carried for movement with respect to said housing for engagement with said collet when said housing is received over the spindle, and spring means reacting between said housing and said washer for urging said washer into bearing engagement with said collet.

25. A spindle clamp assembly for positioning a disc upon a rotatable drive spindle having a shaft portion for reception through an opening formed in the disc, and a base for vertically supporting the disc, comprising:

a radially expansible sleeve receivable about the spindle and within the opening formed in the disc;

a collet receivable about the spindle above said sleeve, said sleeve and said collet being configured with respect to each other such that downward displacement of said collet in bearing engagement with said sleeve causes substantially uniform radial expansion of said sleeve into bearing engagement with the disc for centering the disc with respect to the spindle;

a clamp housing receivable over the spindle and including locking means for locking engagement with the spindle;

biasing means for engaging said collet when said housing is received over the spindle for displacing said collet downwardly for effecting radial expansion of said sleeve; and means for reacting between said housing and the disc for applying a generally vertically directed clamping force to the disc for retaining the disc securely upon the spindle.

26. The spindle clamp assembly of claim 25 wherein said sleeve includes a tapered annular face presented radially inwardly and generally toward said collet, and wherein said collet includes a face presented generally toward said sleeve for bearing engagement with said sleeve face.

27. The spindle clamp assembly of claim 25 wherein the spindle includes means forming a radially outwardly presented recess, and wherein said locking means comprises:

a locking cylinder movably carried in said housing and having a plurality of radial passages formed therein;

locking balls received in said passages; and means for moving said cylinder between a first position with said locking balls positioned partially within said recess for locking said housing on the spindle, and a second position with said locking balls in registry with a radially enlarged chamber formed in said housing for allowing displacement of said balls from said recess and removal of said housing from the spindle.

28. The spindle clamp assembly of claim 25 wherein said biasing means comprises an annular washer carried for movement with respect to said housing for engagement with said collet when said housing is received over the spindle, and spring means reacting between said housing and said washer for urging said washer into bearing engagement with said collet.

29. The spindle clamp assembly of claim 25 wherein said means for reacting between said housing and the disc comprises an annular clamping ring, means for mounting said clamping ring for limited movement with respect to the disc in a plane generally parallel to the disc, and means for urging said clamping ring into annular engagement with the disc about the disc opening when said housing is received over the spindle to apply a substantially uniform clamping force annularly to the disc.

30. A spindle clamp assembly for positioning a disc upon a rotatable drive spindle having a shaft portion for reception through an opening formed in the disc, and a base for vertically supporting the disc, comprising:

a radially expansible sleeve receivable about the spindle and within the opening formed in the disc, said sleeve having an upwardly and inwardly presented tapered face;

a collet receivable about the spindle above said sleeve and including a generally downwardly presented face for bearing engagement with said sleeve face;

a clamp housing receivable over the spindle;

locking means carried by said housing for locking engagement with said spindle;

first biasing means carried by said housing for reacting between said housing and said collet when said housing is received over said spindle for urging said collet downwardly with its downwardly presented face in bearing engagement with said sleeve face for causing substantially uniform radial expansion of said sleeve into bearing engagement with the disc for centering the disc with respect to the spindle;

second biasing means for normally biasing said sleeve to a radially non-expanded configuration;

an annular clamping ring carried by said housing and projecting downwardly therefrom for annular engagement with the disc about the opening in the disc; and third biasing means reacting between said housing and said clamping ring for causing said clamping ring to apply a vertically directed clamping force to the disc when said housing is received over the spindle for retaining the disc securely on the spindle.

31. In a video machine having a rotatable drive spindle with a shaft portion for reception through a central opening in a video information disc, and an enlarged base for vertically supporting the disc, a spindle clamp assembly for accurately and securely positioning the disc with respect to the spindle, comprising:

a radially expansible sleeve receivable about the spindle and within the opening formed in the disc;

locking means receivable over the spindle for locking engagement therewith;

biasing means reacting between said sleeve and said locking means for causing substantially uniform radial expansion of said sleeve when said locking means is received over the spindle for displacing said sleeve radially outwardly into bearing engagement with the disc for centering the disc with respect to the spindle; and clamping means for reacting between said locking means and the disc for applying a clamping force generally vertically to the disc when said locking means is received over the spindle for retaining the disc securely upon the spindle.

32. The spindle clamp assembly of claim 31 including a collet receivable about the spindle between said sleeve and said locking means, said sleeve and said collet being configured with respect to each other such that displacement of said collet toward said sleeve causes substantially uniform radial expansion of said sleeve into bearing engagement with the disc for centering the disc with respect to the spindle, said biasing means reacting between said collet and said locking means for displacing said collet toward said sleeve for causing substantially uniform radial expansion of said sleeve.

33. The spindle clamp assembly of claim 31 wherein the spindle includes means forming a radially outwardly presented recess, and wherein said locking means comprises:

a housing;

a locking cylinder movably carried in said housing and having a plurality of radial passages formed therein;

locking balls received in said passages; and means for moving said cylinder between a first position with said locking balls positioned partially within said recess for locking said housing on the spindle, and a second position with said locking balls in registry with a radially enlarged chamber formed in said housing for allowing displacement of said balls from said recess and removal of said housing from the spindle.

34. The spindle clamp assembly of claim 33 further including means for preventing radially inward motion of said locking balls when said housing is removed from the spindle.

35. The spindle clamp assembly of claim 31 wherein said clamping means comprises an annular clamping ring, means for mounting said clamping ring for limited movement with respect to the disc in a plane generally parallel to the disc, and means for urging said clamping ring into annular engagement with the disc about the disc opening when said locking means is received over the spindle to apply a substantially uniform clamping force annularly to the disc.

36. The spindle clamp assembly of claim 35 wherein the spindle includes an enlarged base with an upstanding annular flange for vertically supporting the disc, and wherein said clamping ring is positioned to apply said clamping force to the disc generally in vertical alignment with the annular flange on the spindle.

37. In a video machine having a rotatable drive spindle with a shaft portion for reception through a central opening in a video information disc, and an enlarged base for vertically supporting the disc, a spindle clamp assembly for accurately and securely positioning the disc with respect to the spindle, comprising:

a radially expansible sleeve receivable about the spindle and within the opening formed in the disc, said sleeve having an upwardly and inwardly presented tapered face;

a collet receivable about the spindle above said sleeve and including a generally downwardly presented face for bearing engagement with said sleeve face;

a clamp housing receivable over the spindle;

locking means carried by said housing for locking engagement with said spindle;

first biasing means carried by said housing for reacting between said housing and said collet when said housing is received over said spindle for urging said collet downwardly with its downwardly presented face in bearing engagement with said sleeve face for causing substantially uniform radial expansion of said sleeve into bearing engagement with the disc for centering the disc with respect to the spindle;

second biasing means for normally biasing said sleeve to a radially non-expanded configuration;

an annular clamping ring carried by said housing for limited vertical motion with respect to said housing and projecting downwardly therefrom for annular engagement with the disc about the disc opening whereby the clamping ring accommodates the disc having a thickness within a range prescribed by the allowable vertical motion of said ring; and third biasing means reacting between said housing and said clamping ring for causing said clamping ring to apply a vertically directed clamping force to the disc wherein said force is substantially uniform within the range of allowable vertical ring motion when said housing is received over the spindle for retaining the disc securely upon the spindle.

* * * * *